US011995775B2

(12) United States Patent
Chui

(10) Patent No.: US 11,995,775 B2
(45) Date of Patent: *May 28, 2024

(54) DELIVERING VIRTUALIZED CONTENT

(71) Applicant: Outward, Inc., San Jose, CA (US)

(72) Inventor: Clarence Chui, Los Altos Hills, CA (US)

(73) Assignee: Outward, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/334,547

(22) Filed: May 28, 2021

(65) Prior Publication Data

US 2021/0287449 A1 Sep. 16, 2021

Related U.S. Application Data

(63) Continuation of application No. 15/965,729, filed on Apr. 27, 2018, now Pat. No. 11,055,915, which is a continuation of application No. 14/068,977, filed on Oct. 31, 2013, now Pat. No. 10,013,804.

(60) Provisional application No. 61/720,857, filed on Oct. 31, 2012.

(51) Int. Cl.
| G06T 11/00 | (2006.01) |
| G06T 19/00 | (2011.01) |
| G06V 20/64 | (2022.01) |
| H04N 7/01 | (2006.01) |
| H04N 21/2343 | (2011.01) |
| H04N 21/4223 | (2011.01) |
| H04N 21/81 | (2011.01) |
| H04N 23/80 | (2023.01) |

(52) U.S. Cl.
CPC .......... *G06T 19/006* (2013.01); *G06T 11/00* (2013.01); *G06V 20/64* (2022.01); *H04N 7/0125* (2013.01); *H04N 21/234318* (2013.01); *H04N 21/4223* (2013.01); *H04N 21/8126* (2013.01); *H04N 23/80* (2023.01)

(58) Field of Classification Search
CPC ....... G06T 19/006; G06T 11/00; G06V 20/64; H04N 5/23229; H04N 21/234318; H04N 21/4223; H04N 21/8126; H07N 7/0125
USPC .......................................... 345/619
See application file for complete search history.

(56) References Cited

U.S. PATENT DOCUMENTS

| 5,941,944 A | 8/1999 | Messerly |
| 6,377,257 B1 | 4/2002 | Borrel |
| 6,654,414 B1 | 11/2003 | Narayanaswami |
| 6,912,293 B1 | 6/2005 | Korobkin |

(Continued)

FOREIGN PATENT DOCUMENTS

| EP | 1113669 | 7/2001 |
| WO | 2012048456 | 4/2012 |

OTHER PUBLICATIONS

Park et al., 'Mixed Reality Based Interactive 3D Story Composition Tool', TIDSE 2006, 181-186.

*Primary Examiner* — Jin Ge
(74) *Attorney, Agent, or Firm* — Van Pelt, Yi & James LLP

(57) ABSTRACT

Techniques for delivering virtualized content are disclosed. In some embodiments, elements in source content are mapped to a set of corresponding database objects, and the set of database objects is modified to generate a virtualized version of the source content. A specification of the virtualized version of the source content is provided to an output device in response to a request from the output device for the source content.

69 Claims, 3 Drawing Sheets

(56) References Cited

U.S. PATENT DOCUMENTS

| | | |
|---|---|---|
| 7,007,295 B1 | 2/2006 | Rose |
| 7,199,836 B1 | 4/2007 | Eleftheriadis |
| 7,839,422 B2 | 11/2010 | Agarwala |
| 8,165,342 B2 | 4/2012 | Reed |
| 8,429,699 B2 | 4/2013 | Rodriguez |
| 8,817,021 B1 | 8/2014 | Hickman |
| 8,965,906 B1 | 2/2015 | Werth |
| 2001/0056477 A1 | 12/2001 | McTernan |
| 2002/0013897 A1 | 1/2002 | McTernan |
| 2002/0154133 A1 | 10/2002 | Dery |
| 2004/0098236 A1 | 5/2004 | Mayer |
| 2005/0002571 A1 | 1/2005 | Hiraga |
| 2005/0105555 A1 | 5/2005 | Oshima |
| 2005/0171964 A1 | 8/2005 | Kulas |
| 2005/0267893 A1 | 12/2005 | Headd |
| 2006/0217979 A1 | 9/2006 | Pahud |
| 2007/0005795 A1 | 1/2007 | Gonzalez |
| 2007/0162568 A1 | 7/2007 | Gupta |
| 2007/0192818 A1 | 8/2007 | Bourges-Sevenier |
| 2007/0214476 A1* | 9/2007 | Zalewski ............ H04N 7/17318 348/E7.071 |
| 2008/0071559 A1 | 3/2008 | Arrasvuori |
| 2008/0120534 A1 | 5/2008 | Moore |
| 2008/0228825 A1 | 9/2008 | Basso |
| 2009/0064257 A1 | 3/2009 | Oehm |
| 2009/0089186 A1 | 4/2009 | Paolini |
| 2009/0144137 A1 | 6/2009 | Moulton |
| 2009/0149233 A1 | 6/2009 | Strause |
| 2009/0165140 A1 | 6/2009 | Robinson |
| 2009/0167787 A1* | 7/2009 | Bathiche ............... G06T 19/006 345/633 |
| 2009/0189974 A1 | 7/2009 | Deering |
| 2009/0254572 A1 | 10/2009 | Redlich |
| 2010/0095236 A1 | 4/2010 | Silberstein |
| 2010/0149399 A1* | 6/2010 | Mukai .................... G01C 21/20 348/333.02 |
| 2010/0157063 A1 | 6/2010 | Basso |
| 2010/0177104 A1 | 7/2010 | Dufour |
| 2010/0246605 A1 | 9/2010 | Taylor |
| 2010/0285884 A1 | 11/2010 | Gauer, III |
| 2010/0289835 A1 | 11/2010 | Holub |
| 2010/0310164 A1 | 12/2010 | Reed |
| 2011/0025689 A1* | 2/2011 | Perez ...................... A63F 13/69 345/420 |
| 2011/0050947 A1 | 3/2011 | Marman |
| 2011/0064388 A1* | 3/2011 | Brown ................. H04N 21/816 704/E13.011 |
| 2011/0110581 A1 | 5/2011 | Yang |
| 2011/0141141 A1 | 6/2011 | Kankainen |
| 2011/0169924 A1 | 7/2011 | Haisty |
| 2011/0169987 A1 | 7/2011 | Gann |
| 2011/0175923 A1 | 7/2011 | Mahajan |
| 2011/0181606 A1* | 7/2011 | Sumner ................... G06T 13/00 345/474 |
| 2011/0182500 A1 | 7/2011 | Esposito |
| 2011/0279445 A1 | 11/2011 | Murphy |
| 2011/0292054 A1 | 12/2011 | Boker |
| 2012/0013644 A1 | 1/2012 | Hiroyuki |
| 2012/0020581 A1 | 1/2012 | Zarom |
| 2012/0021297 A1 | 1/2012 | Hauser |
| 2012/0059953 A1 | 3/2012 | Klappert |
| 2012/0069051 A1 | 3/2012 | Hagbi |
| 2012/0086727 A1 | 4/2012 | Korah |
| 2012/0140025 A1 | 6/2012 | Friedman |
| 2012/0173209 A1 | 7/2012 | Krebs |
| 2012/0194549 A1 | 8/2012 | Osterhout |
| 2012/0256915 A1 | 10/2012 | Jenkins |
| 2012/0256954 A1 | 10/2012 | Soon-Shiong |
| 2012/0300122 A1 | 11/2012 | Liu |
| 2012/0306876 A1 | 12/2012 | Shotton |
| 2013/0044184 A1 | 2/2013 | Sophrin |
| 2013/0167161 A1 | 6/2013 | Liu |
| 2013/0170557 A1 | 7/2013 | Wang |
| 2013/0215115 A1 | 8/2013 | Jenkins |
| 2013/0321574 A1 | 12/2013 | Zhang |
| 2013/0346566 A1 | 12/2013 | Kwon |
| 2014/0069224 A1 | 3/2014 | Dimig |
| 2014/0085314 A1 | 3/2014 | Steinke |
| 2014/0085479 A1 | 3/2014 | Haas |
| 2014/0168218 A1 | 6/2014 | Mitrea |
| 2014/0267309 A1 | 9/2014 | Wilson |

* cited by examiner

DELIVERING VIRTUALIZED CONTENT

CROSS REFERENCE TO OTHER APPLICATIONS

This application is a continuation of U.S. patent application Ser. No. 15/965,729, now U.S. Pat. No. 11,055,915, entitled DELIVERING VIRTUALIZED CONTENT filed Apr. 27, 2018, which is a continuation of U.S. patent application Ser. No. 14/068,977, now U.S. Pat. No. 10,013,804, entitled DELIVERING VIRTUALIZED CONTENT filed Oct. 31, 2013, which claims priority to U.S. Provisional Application No. 61/720,857 entitled RENDERING DIGITAL CONTENT filed Oct. 31, 2012, all of which are incorporated herein by reference for all purposes.

BACKGROUND OF THE INVENTION

Display roadmaps are rapidly transitioning from formats such as Full HD (1920×1080 pixels) to 4K UHD (3840× 2160) as a consumer standard. The industry is also anticipating changes to even larger formats such as 8K UHD (7680×4320) within the next decade. However, the standards being defined for the UHD formats of video (up to 120 frames per second) will challenge available broadcasting and streaming bandwidth, particularly for wireless devices. The standards also challenge the industry's ability to produce input hardware (i.e., camera/video technologies) that matches up to the native output capability of the display hardware for the general consumer. High quality content creation for these new formats is not possible for the common user, and all video content captured prior to the UHD standards will not be natively compatible with display hardware in the near future. That is, the most common online content can never be viewed as a high quality experience with upcoming display hardware. Furthermore, imagers will lag display quality for the foreseeable future. Regardless, for amateur users, environmental/lighting conditions are typically not ideal for capturing high quality content. Moreover, less than ideal timing, shooting problems, spontaneous events, etc., also often reduce the quality of captured content.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
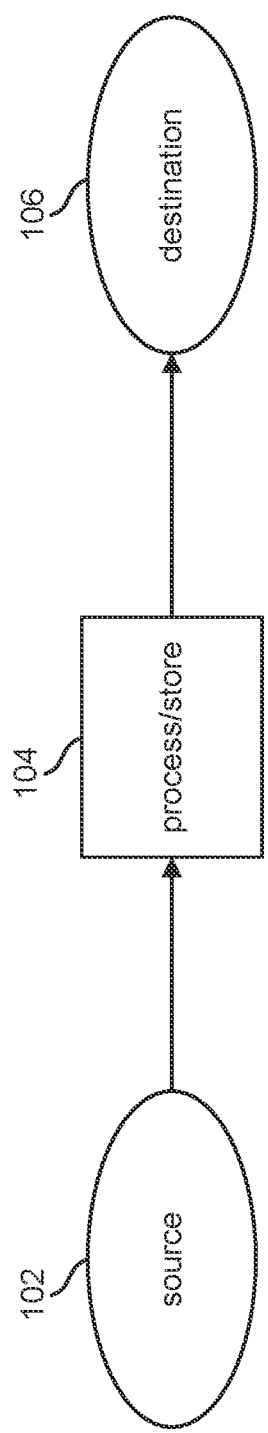
FIG. 1 is a high level block diagram illustrating an embodiment of typical stages associated with communicating content.

FIG. 1 is a high level block diagram illustrating an embodiment of typical stages associated with communicating content, such as image, video, or other multi-media content. At stage 102, source content is captured by a camera or other recording device. The format and quality of the source content is based on the capabilities and limitations of the recording device. At stage 104, the source content is processed and/or stored for immediate (i.e., real time) or later distribution. For example, the content processing of stage 104 may include content compression for easier storage and distribution. In some embodiments, as later described herein, the content processing of stage 104 comprises content conversion into a prescribed computational space. At stage 106, the content is delivered to and rendered at a destination device.

Typically, the quality of rendered content at a destination device is restricted by and does not exceed the quality of the source content despite the rendering capabilities of the destination device. However, the limitations of source content quality pose a growing challenge as rapid improvements occur in the hardware of destination devices. Poor quality source content is not suitable to serve the demands of HD (high definition) and emerging beyond-HD capable destination devices. Standard HD is quickly giving way to 2K HD, which will evolve into 4K HD. Moreover, hardware roadmaps already contemplate 8K HD, i.e., UHD (ultra high definition), which is approximately sixteen times the format size of standard HD.

Techniques for decoupling the format and quality of source content as well as the format and quality of the same content processed for storage and distribution from the rendering capabilities of a destination device are disclosed in detail herein. The disclosed multi-media technology platform facilitates flawless quality when rendering content from an arbitrary source on any of a plurality of types of destination devices by allowing performance up to the capability of the receiving system (including best-in-class display technologies) to be achieved. Thus, a high fidelity, cinematic quality viewing experience may be realized from any image or video source. The disclosed techniques not only allow users to create visually stunning image and video content anywhere, at any time, and on any device without having to be an expert in multi-media content creation tools but also allow users to re-imagine content in nearly unlimited ways. Although image or video source content is described in many of the given examples, the techniques disclosed herein may be extended to and employed with respect to any multi-media content.

Figure 2:
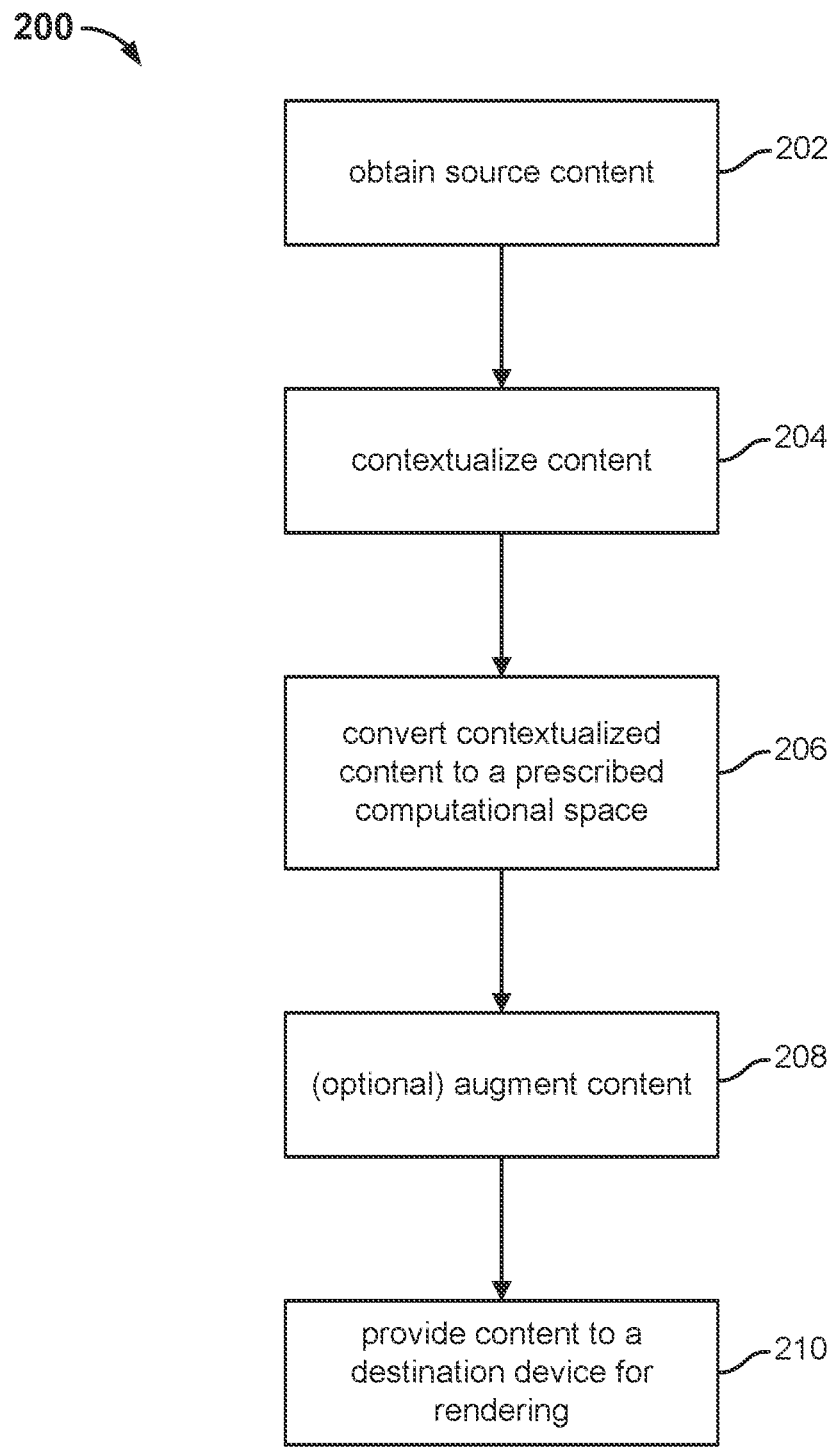
FIG. 2 is a flow chart illustrating an embodiment of a high level content distribution process based on context abstraction.

FIG. 2 is a flow chart illustrating an embodiment of a high level content distribution process based on context abstraction. At step 202, source content is obtained. For example, image or video content is obtained at step 202 from a device employed to capture the content and/or previously captured content is obtained from storage. At step 204, the content obtained at step 202 is contextualized. For example, one or more elements and/or characteristics of the context of the content are identified at step 204. At step 206, the contextualized content is converted to a prescribed, proprietary computational space. For example, elements and/or characteristics of the context of the content identified at step 204 are abstracted and transformed into object-based representations at step 206. Such object-based representations may be based on existing object assets residing in a database or cloud of assets. Alternatively, a new object representation may be determined and added to such a database or cloud. In some embodiments, the conversion of step 206 substantially, if not completely, virtualizes the source content such that little, if any, of the original source content (e.g., pixel and/or other data) is preserved when converted to the computational space based representation at step 206.

The content is optionally augmented at step 208. In most cases, the content is augmented to include at least one or more elements or features that were never a part of the original content obtained at step 202 but are included to provide an enhanced viewing experience at a destination device. At step 210, the content is provided to a destination device for rendering. Since the computational space is agnostic to the destination device, a perfect match for the capabilities of any destination device can be achieved using process 200. Thus, content may be rendered at a destination device based on the native format of the destination device as well as in the best quality supported by the destination device. For example, using process 200, source content captured via a relatively low resolution mobile phone camera may be rendered at a high resolution destination device in cinematic quality. In some embodiments, the content augmentation of step 208 may be performed client-side at a destination device.

As described, process 200 facilitates a high fidelity viewing experience regardless of the format or quality of the source content and offers unprecedented variability within the actually rendered content. The disclosed platform does not comprise merely compressing, upscaling, and/or replicating the appearance of source content. Rather, information gathered from contextual clues from the source content is employed to virtualize or create a re-imagined version of the content. In most cases, information is being added to, not removed from, the content. That is, more information than what is present in the original source content is provided for rendering at an output device. In many cases, the virtualized or re-imagined version of the source content comprises very little, if any, of the data comprising the original source content. Moreover, the content may be re-imagined differently for different output devices, for example, based on the rendering capabilities of the devices and/or other criteria associated with the devices. A key objective of the disclosed approach is not to create a lossless version of the source content, although that may coincidentally be an outcome, but rather to prioritize creation of content best suited for the capabilities of a destination device and/or customized for the destination device or a user thereof.

Figure 3:
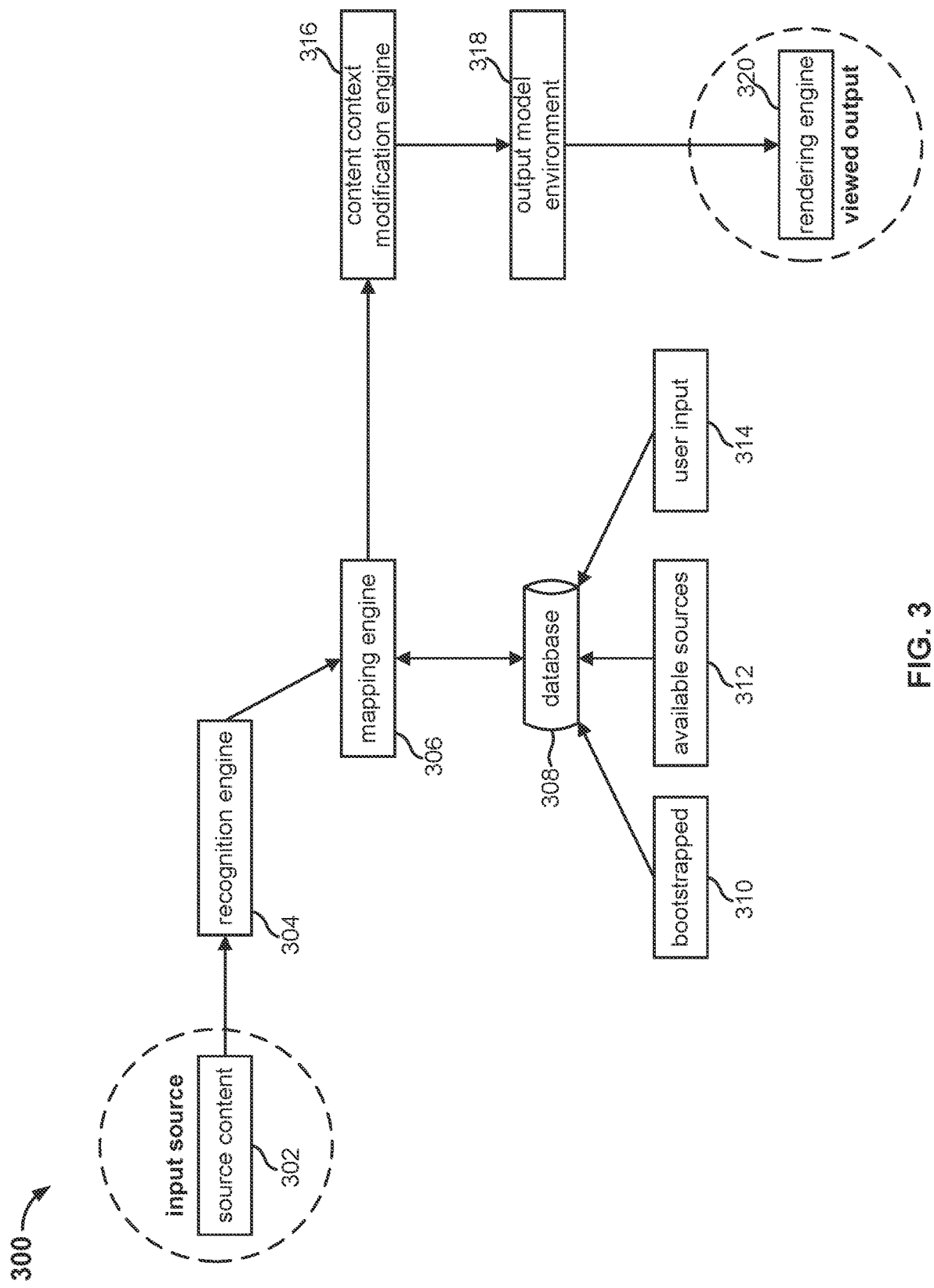
FIG. 3 is a block diagram illustrating an embodiment of the architecture of the disclosed content distribution platform based on context abstraction.

FIG. 3 is a block diagram illustrating an embodiment of the architecture of the disclosed content distribution platform based on context abstraction. This architecture provides novel techniques for creating, re-imagining, remastering, streaming, and rendering digital content. The various blocks of content distribution platform 300, for example, may be configured to perform corresponding steps of process 200 of FIG. 2. Block 302 comprises source content obtained from an input source. In various embodiments, the input source may comprise an imaging device (such as a camera) or may comprise existing multi-media content. Block 304 comprises a recognition engine configured to identify one or more elements and/or characteristics of input source content 302. That is, recognition engine 304 contextualizes source content 302. In various embodiments, recognition engine 304 may be configured to identify features, objects, background, illumination environment, etc., within input source content 302 using any combination of one or more standard and proprietary machine vision methods and/or assisted by human input.

Block 306 comprises a mapping engine configured to correlate and map the elements and/or characteristics identified by recognition engine 304 to the best matches available from an existing database 308 in which object specifications comprise prescribed computational space based representations. In some embodiments, mapping engine 306 is further configured to determine relative positions and orientations of identified objects within the model environment or scene representing the input source content. In many cases, objects in database 308 may need to be morphed or modified through available parameterization to match identified objects. In cases in which a suitably close match cannot be identified, an object may be substituted for by a best guess. Alternatively, an object and its associated properties may be created on an ad hoc basis from an analysis of source content 302 (e.g., by extracting geometry and texture) and submitted into database 308 for use during matching and mapping. In some cases, the correlation and/or mapping performed by mapping engine 306 is at least in part assisted by human input. In many cases, the environment or scene representing the input source content modeled by mapping engine 306 comprises little, if any, of the original data comprising input source content 302 since the modeled environment or scene comprises database object based representations of content. Thus, input source content 302 is effectively virtualized or re-imagined.

Block 308 comprises a database comprising an archive of available master objects and their associated properties. The depth and complexity of database 308 increases over time as it is populated as more and more data becomes available. An object entry in database 308 may comprise any appropriate and applicable parameters for specifying the object. For example, an object specification may include data comprising geometry (e.g., shape and size), surface texture, optical response to illumination, and/or any additional properties associated with the object (e.g., brand name, date and location of origin of manufacture, material properties, etc.). In some embodiments, object properties are parameterized to the extent possible to broaden the class of objects that can be represented by a given master object. Database 308 may be populated using any one or more appropriate techniques, some examples of which are depicted in FIG. 3. For instance, data comprising database 308 may be bootstrapped

310. That is, an object model may be created by directly extracting relevant data from input source content 302. Further, data comprising database 308 may be extracted from available sources 312. That is, object data may be extracted from other existing sources of image and/or video content. Moreover, data comprising database 308 may at least in part be entered by a user 314. That is, object data may be provided by user input comprising, for example, modeled/simulated data and/or data obtained via direct scanning and/or imaging of physical objects. Database 308 stores data associated with frequently appearing objects that can be used to generate content and adaptively improves over time as more objects and/or associated properties are learned.

Block 316 comprises a content context modification engine configured to modify and/or customize the environment or scene modeled by mapping engine 306 according to desired performance criteria. For example, the modeled environment may be altered by modifying objects, substituting objects with alternatives, and/or removing objects altogether. Moreover, the lighting of the modeled environment (e.g., lighting type and position, luminance, chromaticity, etc.) may be modified. In addition, perceived performance errors in the modeled environment or scene may be appropriately corrected as applicable. In the case of human subjects (i.e., parameterized master objects representing people in the source content), for instance, problems in gaze, appearance, etc., may be corrected. Furthermore, alternative camera positions/perspectives may be introduced into the modeled environment, for example, in addition to or instead of a default virtual camera appropriately located in a position to recreate a perspective defined by the source content.

Block 318 represents providing or outputting the modeled environment, for example, to a (requesting) client or destination device at which the modeled environment is desired to be rendered. Instead of original source content 302 being provided, parameters defining objects comprising the model representing source content 302 are delivered. Such a model environment specification may include, for example, object identifications, relative positions, and orientations; background and lighting environment specifications; camera position; etc. In some embodiments, a subset of the object database needed to create the modeled scene is provided. Alternatively, a copy of the subset of the object database needed to create the modeled scene may already be available at the client site or destination device to which the model environment is delivered and thus need not be provided. In some embodiments, block 318 includes storing a specification of the modeled environment or scene, e.g., for later distribution.

Block 320 comprises a rendering engine configured to render the environment or scene defined by the model at an output device (e.g., a flat panel display) with the characteristics of the objects referenced to the properties provided by the object database. Best in class techniques from the computer graphics industry may be applied by rendering engine 320 when rendering a scene. The subset of the object database needed to render the scene may be accessed by rendering engine 320 through a local copy or through direct access to database 308. In many cases, the scene is rendered by rendering engine 320 with a quality that is matched to the maximum quality performance achievable by the output device, i.e., is optimally matched to the display format, color performance, frame rate, etc., of the output device. Moreover, the scene rendered by rendering engine 320 may be personalized or customized based on a user and/or profiling of a user of the output device.

The described techniques for content distribution based on context abstraction offer numerous benefits. A high quality viewing experience may be delivered regardless of the quality of the source content and even when the source content is significantly degraded, e.g., due to compression artifacts or other noise. In many cases, the source content only has to be of sufficient quality for recognition engine 304 to identify features, objects, and background types. For example, in some cases, six bits of color per pixel in the source content are sufficient rather than thirty bits. Moreover, compression based block artifacts are in most cases acceptable; thus, very high compression ratios via traditional methods may be used to store the source content.

A scene captured by a common user using a device with consumer grade sensors having limited dynamic range is not only of relatively low resolution/quality but also is typically filmed without proper lighting or environmental conditions. However, using the disclosed techniques, viewed content can still be very high quality. Once an object is recognized, local tone correction can be applied, and highlights saturating an image can be corrected naturally when the scene is relit. Similarly, any other perceived imperfections can be corrected in or removed from the scene. For example, image stabilization as well as post processing to correct for performance errors may be introduced as applicable. With respect to a human subject, for instance, gaze may be corrected, closed eyes may be opened, stray hair may be removed, etc.

In various embodiments, content may be edited and/or re-imagined with any number of alternative visual qualities (e.g., lighting, surface characteristics, camera perspective, etc.) than originally intended from the source, and new and/or different content may be introduced. For example, a scene may be re-rendered with an advertiser's content such as brands, images, products, etc. Moreover, content may be personalized or customized based on an end user. Since object models may be specified in 3D in database 308, corresponding content may be naturally rendered in 3D if desired. Conversely, content may be rendered as a cartoon (e.g., in anime style) if desired.

For many applications, the disclosed content distribution techniques significantly reduce required communication bandwidth, for example, compared to traditional video codec approaches. Ultra-low bandwidth is especially feasible with fairly static scenes since object motion is the only required data that needs to be communicated. For example, video conferencing applications (such as telepresence, video chat, mobile video calls, etc.) are particularly well-suited for the disclosed platform. Source content from a low quality webcam, for instance, may be rendered in a UHD enabled telepresence conference room in cinematic quality. In addition to providing an ultra-low bandwidth solution for many applications, the disclosed content distribution techniques facilitate cinematic quality content creation at very low cost and overhead and without requiring expertise by an end user. Existing content may be easily re-imagined and/or remastered in limitless ways. For example, any archived image or video source may be rendered beautifully with cinematic quality on a UHD display. Additional applicable fields in which the disclosed techniques may be especially relevant include applications in the gaming, entertainment, and education industries as well as in any other industry in which efficient content distribution is paramount.

The described content contextualization platform is furthermore amenable to search applications, particularly contextual based image and video searches. A search may be conducted by searching for something according to one or more object definition criteria. Alternatively, a search may be conducted by creating content that best matches the search criteria. Content may be created, for instance, by modifying something that is quite close already (e.g., by re-lighting, re-orienting, and/or color correction; object removal and/or editing; etc.). Searches may be efficiently conducted against a network of one or more databases (such as database 308) comprising content libraries of object assets.

The manner in which database objects are specified and stored in the described architecture moreover facilitates future proofing multi-media content libraries with respect to evolving display and viewing technologies and standards. Further, content generation in 2D and 3D is easily supported since many database objects are inherently specified in 3D. Additionally, multi-scale object databases may be linked, facilitating support of an "infinite zoom" feature allowing advanced zooming, possibly down to even micro-scale and nano-scale levels.

In addition to the aforementioned advantages and applications, market trends in display technology are anticipated to favor the disclosed content distribution techniques based on context abstraction. To accommodate emerging display technologies, a new paradigm for content distribution will be imperative. The disclosed techniques provide one such architecture that is not only viable and scalable but also economic and resource efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
mapping elements in source content to a set of database objects, wherein the set of database objects comprises existing database objects to which elements of the source content are mapped;
modifying the set of database objects to generate a virtualized version of the source content, wherein the virtualized version of the source content comprises at least some different information than the source content; and
storing a specification of the virtualized version of the source content;
wherein the specification of the virtualized version of the source content is provided to an output device in response to a request from the output device for the source content and wherein the specification of the virtualized version of the source content facilitates rendering of the virtualized version of the source content at the output device at a quality that exceeds source content quality;
wherein the virtualized version of the source content comprises a personalized or customized augmented version of the source content that includes at least one element or feature that was never a part of the source content and that is based on profiling of a user of the output device to provide an enhanced personalized or customized viewing experience at the output device.

2. The method of claim 1, wherein the virtualized version of the source content comprises more information than the source content.

3. The method of claim 1, wherein the specification of the virtualized version of the source content facilitates rendering of the virtualized version of the source content according to different rendering capabilities of any of a plurality of types of output devices.

4. The method of claim 1, wherein providing the specification of the virtualized version of the source content uses less communication bandwidth than providing the source content.

5. The method of claim 1, wherein a format of the source content, a format of the specification of the virtualized version of the source content, and a format in which the virtualized version of the source content is rendered at the output device comprise different formats.

6. The method of claim 1, wherein a rendering of the virtualized version of the source content at the output device comprises a higher resolution than the source content.

7. The method of claim 1, wherein a rendering of the virtualized version of the source content at the output device comprises a native format of the output device.

8. The method of claim 1, wherein a rendering of the virtualized version of the source content at the output device comprises a maximum quality achievable at the output device.

9. The method of claim 1, wherein a rendering of the virtualized version of the source content at the output device comprises 2D.

10. The method of claim 1, wherein a rendering of the virtualized version of the source content at the output device comprises 3D.

11. The method of claim 1, wherein a rendering of the virtualized version of the source content at the output device is matched to a display format, color performance, frame rate, or combination thereof of the output device.

12. The method of claim 1, wherein a format in which the virtualized version of the source content is rendered at the output device is different than formats in which the virtualized version of the source content is rendered at one or more other output devices.

13. The method of claim 1, wherein the source content comprises 2D and the virtualized version of the source content comprises 3D.

14. The method of claim 1, wherein the virtualized version of the source content does not comprise any original source content.

15. The method of claim 1, wherein the virtualized version of the source content is re-imagined with one or more alternative visual qualities relative to the source content.

16. The method of claim 1, wherein modifying the set of database objects to generate the virtualized version of the source content comprises augmenting the set of database objects.

17. The method of claim 1, wherein modifying the set of database objects to generate the virtualized version of the source content comprises modifying one or more database objects of the set of database objects.

18. The method of claim 1, wherein modifying the set of database objects to generate the virtualized version of the source content comprises customizing one or more database objects of the set of database objects.

19. The method of claim 1, wherein modifying the set of database objects to generate the virtualized version of the source content comprises substituting one or more database objects of the set of database objects with alternatives.

20. The method of claim 1, wherein modifying the set of database objects to generate the virtualized version of the source content comprises removing one or more database objects of the set of database objects.

21. The method of claim 1, wherein modifying the set of database objects to generate the virtualized version of the source content comprises modifying lighting.

22. The method of claim 1, wherein modifying the set of database objects to generate the virtualized version of the source content comprises correcting perceived performance errors.

23. The method of claim 1, wherein modifying the set of database objects to generate the virtualized version of the source content comprises modifying camera perspective.

24. A system, comprising:
a processor configured to:
  map elements in source content to a set of database objects, wherein the set of database objects comprises existing database objects to which elements of the source content are mapped;
  modify the set of database objects to generate a virtualized version of the source content, wherein the virtualized version of the source content comprises at least some different information than the source content; and
  store a specification of the virtualized version of the source content;
  wherein the specification of the virtualized version of the source content is provided to an output device in response to a request from the output device for the source content and wherein the specification of the virtualized version of the source content facilitates rendering of the virtualized version of the source content at the output device at a quality that exceeds source content quality;
  wherein the virtualized version of the source content comprises a personalized or customized augmented version of the source content that includes at least one element or feature that was never a part of the source content and that is based on profiling of a user of the output device to provide an enhanced personalized or customized viewing experience at the output device; and
a memory coupled to the processor and configured to provide the processor with instructions.

25. A computer program product embodied in a non-transitory computer usable storage medium, comprising computer instructions for:
  mapping elements in source content to a set of database objects, wherein the set of database objects comprises existing database objects to which elements of the source content are mapped;
  modifying the set of database objects to generate a virtualized version of the source content, wherein the virtualized version of the source content comprises at least some different information than the source content; and
  storing a specification of the virtualized version of the source content;
  wherein the specification of the virtualized version of the source content is provided to an output device in response to a request from the output device for the source content and wherein the specification of the virtualized version of the source content facilitates rendering of the virtualized version of the source content at the output device at a quality that exceeds source content quality;
  wherein the virtualized version of the source content comprises a personalized or customized augmented version of the source content that includes at least one element or feature that was never a part of the source content and that is based on profiling of a user of the output device to provide an enhanced personalized or customized viewing experience at the output device.

26. The system of claim 24, wherein the virtualized version of the source content comprises more information than the source content.

27. The system of claim 24, wherein the specification of the virtualized version of the source content facilitates rendering of the virtualized version of the source content according to different rendering capabilities of any of a plurality of types of output devices.

28. The system of claim 24, wherein providing the specification of the virtualized version of the source content uses less communication bandwidth than providing the source content.

29. The system of claim 24, wherein a format of the source content, a format of the specification of the virtualized version of the source content, and a format in which the virtualized version of the source content is rendered at the output device comprise different formats.

30. The system of claim 24, wherein a rendering of the virtualized version of the source content at the output device comprises a higher resolution than the source content.

31. The system of claim 24, wherein a rendering of the virtualized version of the source content at the output device comprises a native format of the output device.

32. The system of claim 24, wherein a rendering of the virtualized version of the source content at the output device comprises a maximum quality achievable at the output device.

33. The system of claim 24, wherein a rendering of the virtualized version of the source content at the output device comprises 2D.

34. The system of claim 24, wherein a rendering of the virtualized version of the source content at the output device comprises 3D.

35. The system of claim 24, wherein a rendering of the virtualized version of the source content at the output device is matched to a display format, color performance, frame rate, or combination thereof of the output device.

36. The system of claim 24, wherein a format in which the virtualized version of the source content is rendered at the output device is different than formats in which the virtualized version of the source content is rendered at one or more other output devices.

37. The system of claim 24, wherein the source content comprises 2D and the virtualized version of the source content comprises 3D.

38. The system of claim 24, wherein the virtualized version of the source content does not comprise any original source content.

39. The system of claim 24, wherein the virtualized version of the source content is re-imagined with one or more alternative visual qualities relative to the source content.

40. The system of claim 24, wherein to modify the set of database objects to generate the virtualized version of the source content comprises to augment the set of database objects.

41. The system of claim 24, wherein to modify the set of database objects to generate the virtualized version of the source content comprises to modify one or more database objects of the set of database objects.

42. The system of claim 24, wherein to modify the set of database objects to generate the virtualized version of the source content comprises to customize one or more database objects of the set of database objects.

43. The system of claim 24, wherein to modify the set of database objects to generate the virtualized version of the source content comprises to substitute one or more database objects of the set of database objects with alternatives.

44. The system of claim 24, wherein to modify the set of database objects to generate the virtualized version of the source content comprises to remove one or more database objects of the set of database objects.

45. The system of claim 24, wherein to modify the set of database objects to generate the virtualized version of the source content comprises to modify lighting.

46. The system of claim 24, wherein to modify the set of database objects to generate the virtualized version of the source content comprises to correct perceived performance errors.

47. The system of claim 24, wherein to modify the set of database objects to generate the virtualized version of the source content comprises to modify camera perspective.

48. The computer program product of claim 25, wherein the virtualized version of the source content comprises more information than the source content.

49. The computer program product of claim 25, wherein the specification of the virtualized version of the source content facilitates rendering of the virtualized version of the source content according to different rendering capabilities of any of a plurality of types of output devices.

50. The computer program product of claim 25, wherein providing the specification of the virtualized version of the source content uses less communication bandwidth than providing the source content.

51. The computer program product of claim 25, wherein a format of the source content, a format of the specification of the virtualized version of the source content, and a format in which the virtualized version of the source content is rendered at the output device comprise different formats.

52. The computer program product of claim 25, wherein a rendering of the virtualized version of the source content at the output device comprises a higher resolution than the source content.

53. The computer program product of claim 25, wherein a rendering of the virtualized version of the source content at the output device comprises a native format of the output device.

54. The computer program product of claim 25, wherein a rendering of the virtualized version of the source content at the output device comprises a maximum quality achievable at the output device.

55. The computer program product of claim 25, wherein a rendering of the virtualized version of the source content at the output device comprises 2D.

56. The computer program product of claim 25, wherein a rendering of the virtualized version of the source content at the output device comprises 3D.

57. The computer program product of claim 25, wherein a rendering of the virtualized version of the source content at the output device is matched to a display format, color performance, frame rate, or combination thereof of the output device.

58. The computer program product of claim 25, wherein a format in which the virtualized version of the source content is rendered at the output device is different than formats in which the virtualized version of the source content is rendered at one or more other output devices.

59. The computer program product of claim 25, wherein the source content comprises 2D and the virtualized version of the source content comprises 3D.

60. The computer program product of claim 25, wherein the virtualized version of the source content does not comprise any original source content.

61. The computer program product of claim 25, wherein the virtualized version of the source content is re-imagined with one or more alternative visual qualities relative to the source content.

62. The computer program product of claim 25, wherein modifying the set of database objects to generate the virtualized version of the source content comprises augmenting the set of database objects.

63. The computer program product of claim 25, wherein modifying the set of database objects to generate the virtualized version of the source content comprises modifying one or more database objects of the set of database objects.

64. The computer program product of claim 25, wherein modifying the set of database objects to generate the virtualized version of the source content comprises customizing one or more database objects of the set of database objects.

65. The computer program product of claim 25, wherein modifying the set of database objects to generate the virtualized version of the source content comprises substituting one or more database objects of the set of database objects with alternatives.

66. The computer program product of claim 25, wherein modifying the set of database objects to generate the virtualized version of the source content comprises removing one or more database objects of the set of database objects.

67. The computer program product of claim 25, wherein modifying the set of database objects to generate the virtualized version of the source content comprises modifying lighting.

68. The computer program product of claim 25, wherein modifying the set of database objects to generate the virtualized version of the source content comprises correcting perceived performance errors.

69. The computer program product of claim 25, wherein modifying the set of database objects to generate the virtualized version of the source content comprises modifying camera perspective.

* * * * *